United States Patent [19]

Wrasidlo et al.

[11] Patent Number: 4,855,162

[45] Date of Patent: Aug. 8, 1989

[54] POLYTETRAFLUOROETHYLENE COATING OF POLYMER SURFACES

[75] Inventors: Wolfgang J. Wrasidlo, LaJolla; Frieder K. Hofmann, Oceanside; Karol J. Mysels, LaJolla, all of Calif.

[73] Assignee: Memtec North America Corp., Buffalo Grove, Ill.

[21] Appl. No.: 74,635

[22] Filed: Jul. 17, 1987

[51] Int. Cl.$^4$ .......................... B05D 5/00; B05D 3/02
[52] U.S. Cl. .................................. 427/243; 427/244; 427/393.4; 427/393.5
[58] Field of Search ................... 427/393.4, 393.5, 243, 427/244

[56] References Cited

U.S. PATENT DOCUMENTS

| | | | |
|---|---|---|---|
| 2,764,505 | 9/1956 | Kilbo, Jr. et al. | 427/393.5 |
| 3,429,846 | 2/1969 | Bechtold et al. | 427/393.5 |
| 4,232,087 | 11/1980 | Trask | 427/393.4 |
| 4,382,990 | 5/1983 | Coates | 427/393.4 |
| 4,595,628 | 6/1986 | Kelly et al. | 427/393.4 |

Primary Examiner—Janyce Bell
Attorney, Agent, or Firm—Waldron & Associates

[57] ABSTRACT

Adherent, PTFE coatings on polymer surfaces can be produced at temperatures well below the sintering temperature of PTFE, by contacting the surface with a dilute dispersion of PTFE particles and heating the surface to its softening point (in the vicinity of its glass transition temperature) to dry it and to cause the individual particles to become embedded in and surrounded by the polymer.

8 Claims, No Drawings

POLYTETRAFLUOROETHYLENE COATING OF POLYMER SURFACES

TECHNICAL FIELD

This invention relates to a method for coating polymer surfaces with fluoroplastics, and is particularly related to a method for increasing the water repellency of such surfaces by coating with dispersions of polytetrafluoroethylene polymers.

BACKGROUND ART

Fluoroplastics are known to offer a unique combination of chemical, electrical, and mechanical properties which makes them useful over a broad range of applications. One such fluoroplastic, polytetrafluoroethylene (PTFE), exhibits exceptional resistance to chemicals. Aqueous dispersions of PTFE have been used to impregnate fabrics to impart hydrophobic properties and resistance to chemicals, as shown, for example, in U.S. Pat. No. 4,342,675. PTFE coatings are most commonly achieved by contacting the surface to be coated with a dispersion containing about 45–50% solids, drying, and heating the resin particles to temperatures of 357°–400° C. to cause the particles to sinter and thereby bond to the surface. It has also been suggested that coatings with a degree of useful properties can be achieved at temperatures below that of the sintering temperature of TFE resin particles by either: (i) spray-coating the polymer surface with a volatile solvent for the polymer, sufficient to soften the surface, causing it to become tacky and thereby penetrable by the PTFE particles, as shown in U.S. Pat. No. 3,200,006; (ii) the use of pressure to embed the particles into the substrate, see for example DuPont Product Information Bulletin No. X-50G; or (iii) the use of chemical coupling agents (heavy metal organic complexes) which are capable of bonding both to the PTFE particles and the surface to be coated, see U.S. Pat. Nos. 3,968,297 and 4,232,087. However, these procedures will be of limited value for those substrates in which the dissolution thereof, the use of the compressive forces, or the use of contaminating chemicals would be a serious detriment to the coated surface, e.g., for membranes employed in filtration and medicinal applications.

DISCLOSURE OF INVENTION

It has now been found that a substantial degree of hydrophobicity can be imparted to polymer surfaces, whether in the form of cast films or membranes, or woven or nonwoven fabrics, by coating such surfaces with dilute dispersions of PTFE homopolymers or TFE copolymers utilizing: (i) temperatures within a narrow range, to achieve a novel type of bonding between the substrate and the coating particles; preferably in combination with (ii) dispersions having a dilution about an order of magnitude lower than has most commonly been employed; and (iii) wetting agents which can be evaporated at temperatures below that at which bonding of the particles is effected. The dilute dispersions contain PTFE particles, dispersing agents in sufficient amounts to maintain the particles in suspension, wetting agents to permit uniform distribution of the particles on the surface and a vehicle; further, the dispersion has a solids content within the range of 0.1 to 6.0% and it is essentially devoid of heavy metal organic complexes. Thus, the invention comprises the use of aqueous PTFE dispersions (in which the particles have particles sizes essentially within the range 0.05 to 3 $\mu$m, preferably 0.1 to 0.5 $\mu$m) containing a volatile wetting agent and having a solids content of 0.1 to 6 percent, preferably 0.3 to 1 percent, wherein such dispersions are contacted with the surface to be coated, which is then heated both to evaporate the wetting agent and to achieve softening or segmental mobility. Once the wetting agent has been removed, the resulting softening permits the molecules of the surface to be drawn around the base of the particles, to produce a bond which has been found to provide an adherent coating which exhibits a superior degree of hydrophobicity. The above method can be employed with any polymer which exhibits a transformation from a solid to a more or less viscous liquid state over a comparatively broad temperature range—rather than the abrupt change associated with purely crystalline materials. With the exception of a few materials (e.g., melamine and silicone), most polymers exhibit such a transformation, known as the glass transition, in which the polymer viscosity decreases rapidly as temperature is increased. Surface softening is generally associated with the onset of that transformation. To the extent that requisite surface softening is achieved, the bonding mechanism of this invention could be employed up to the temperature (357° C.) at which the PTFE particles will sinter. However, because it can provide bonding while avoiding surface degradation, the instant method will be of particular benefit in coating polymers: (i) which exhibit softening at temperatures below 250° C., and more generally below 200° C.; and (ii) in the absence of substantial compressive force, i.e., pressure of a degree which would cause the particles to be embedded-absent softening of the polymer surface.

MODES FOR CARRYING OUT THE INVENTION

Although PTFE coatings are known to enhance chemical resistance, the principal objective of the instant invention is to impart hydrophobic or anti-wetting properties to the polymer surfaces. Initial trials were conducted by coating a commercially available polysulfone filtration membrane. To prevent destruction or degradation of the pores of this membrane, experimentation was conducted to determine if adherence could be achieved at temperatures well below that at which actual flow ($T_m$) was encountered. For polysulfone, it was determined that a temperature of 180° C. was sufficient to achieve a desirable degree of surface softening. It should be noted that this temperature is somewhat below the glass transition temperature, $T_g$, of polysulfone, variedly reported to be, for example, 187°, 190°, and 195° C. in the literature. Hydrophobicity, i.e., the degree of adhesion of water droplets to the coated surface, was determined by the visual observation and characterization of the contact angle, i.e., the degree of beading, of small water droplets on the coated surface. Using such visual observation, the degree of hydrophobicity imparted could be set forth in three categories: (I) "superior"—in which the contact angle was very steep, i.e., of the order of 90°; (II) "satisfactory"—in which the contact angle was of the order of 45°; and (III) "unsatisfactory"—those in which the contact angle was markedly shallow.

The dip coating of the polysulfone membrane with a commercial PTFE dispersion (TEFLON 30, sold by DuPont Company, Wilmington, De., containing about 60 percent solids and about 6 percent of a wetting agent)

proved comparatively ineffective in imparting hydrophobic properties. Utilizing Scanning Electron Micrographs (SEM), it was determined that lower PTFE solids concentrations would produce a discontinuous, monolayer of adherent particles which exhibited enhanced hydrophobicity in comparison with the essentially continuous, smooth layer of particles, which resulted from the use of the high PTFE concentrations. A set of experiments was run in which the TEFLON 30 was diluted with: (a) an aqueous solution containing 0.5 percent perfluorooctanoic acid (PFOA) neutralized with ammonium hydroxide (rather than NaOH so as to maintain requisite volatility) to a pH of 7.3; and (b) an aqueous solution of 16 percent isopropanol, to produce dispersions of varying solids content. The polysulfone membranes were soaked in the PTFE dispersions for about one second and thereafter heated to 180° C., both to evaporate the wetting agent and soften the surface. The results are reported in the Table below:

TABLE

| (a) wetting agent - PFOA neutralized to pH of 7.3 | |
|---|---|
| PTFE Solids concentration (%) | Hydrophobicity |
| 0.3 | II |
| 0.42 | I |
| 0.54 | I |
| 0.66 | II |
| 0.78 | II |

| (b) wetting agent - isopropanol | |
|---|---|
| PTFE Solids concentration (%) | Hydrophobicity |
| 0.2 | II |
| 0.4 | II |
| 0.8 | I |
| 1.6 | I |
| 3.2 | I |

It is seen from the results above, utilizing a temperature, 180° C., far below that suggested in the literature (for dispersions devoid of organo-metallic complexes to achieve bonding), that "superior" hydrophobicity could be achieved by utilizing dilute dispersions of PTFE particles in which the optimum solids concentration is, to some extent, a function of the wetting agent employed. Thus, with PFOA at a pH of 7.3, superior anti-wetting is achieved in a narrow concentration range of about 0.5 percent PTFE particles; while, for the isopropanol wetting agent, the optimum solids concentration would be about 1-3 percent.

For those end-uses in which melting of the polymer surface would be detrimental, it is, of course, necessary that the surface be heated to a temperature well below the melting point ($T_m$) of the polymer. The maximum temperature at which the surface should be heated will depend largely on the degree of surface degradation which can be tolerated. Even in those instances in which a substantial degree of degradation is tolerable, there will be little need to maintain the temperature of the surface at a value more than 20° C. above the softening point, to achieve a desired degree of bonding. Generally, such bonding will be achieved with a temperature no more than 10° C. thereabove. In any event, the surface must, however, be heated to a temperature high enough and long enough to evaporate the wetting agent and to achieve a sufficient degree of softening or segmental mobility, whereby the colloidal PTFE particles can become embedded into the surface. Scanning Electron Micrographs (SEM) suggest that an intermolecular type of force, such as van der Waals interaction, appears to draw the surface molecules (capable of movement at the "softening" temperature) around the base of each particle. The enhanced bonding apparently results from attraction between the enlarged contact area of the two surfaces, i.e., the coated polymer surface which is in contact with and surrounds the surface quadrant of the PTFE particle embedded therein.

The specific temperature at which optimum "softening" will occur for each polymer cannot be predetermined with complete specificity; although it will generally be in the vicinity of $T_g$—the glass transition temperature. However, use of $T_g$'s variedly reported in the literature for a particular polymer may, in some instances, be insufficient to achieve the segmental mobility necessary to achieve the desired adherence; while in many instances, the reported $T_g$ may be too high and detrimental to the surface. Thus, $T_g$ can vary not only with the structural and morphological parameters (e.g., degree of substitution, molecular-weight distribution, degree of chain entanglement) of a given polymer, but also with the experimental parameters (heating and/or penetration rate) employed in its determination. Therefore, for any given polymer surface and heating method to be employed, it will be preferable to determine, empirically, the requisite surface "softening" temperature, at which segmental mobility is sufficient to permit the molecules of the surface to be drawn around the base of the PTFE particles. In this regard, it must be borne in mind that such surface-particle interaction can only occur after the wetting agent has evaporated. The above notwithstanding, $T_g$ can nevertheless serve as a guide, or starting point, in determining the optimum "softening" temperature—particularly when $T_g$ has been determined by measuring volume expansion (at conventional heat-up rates) of the polymer as a function of temperature, such that $T_g$ is the temperature at which the volume expansion coefficient shows an abrupt change. Requisite softening will generally be achieved by heating the polymer surface to a temperature below the $T_g$ determined by the above volume expansion procedure.

What is claimed is:

1. In the coating of polymer surfaces to impart an adherent coating of polytetrafluoroethylene (PTFE) resin to the surface, wherein an aqueous dispersion of PTFE- containing particles having a particle size within the range of 0.05 to 3.0 microns is deposited on the surface, and the surface is thereafter heated to volatize the liquids in said dispersion and cause the particles to adhere to the surface, the improvement which comprises: (i) providing a polymer surface that exhibits a glass transition and softens at temperatures below 250° C. and a dispersion consisting essentially of PTFE particles, dispersing agents sufficient to maintain the particles in suspension and wetting agents to permit the uniform distribution of the particles on the surface, said dispersion having a solids content in the range of 0.1 to 6.0% and being essentially devoid of heavy metal organic complexes, (ii) depositing the dispersion on the surface, and (iii) heating the polymer surface to a temperature at least equal to, but not more than 20° C. above, its softening temperature and maintaining said temperature for a time sufficient to soften said surface and embed said particles therein so to produce an essentially discontinuous, mono particulate coating of said particles.

2. The method of claim 1, in which said coating is conducted in the absence of substantial compressive force.

3. The method of claim 2, in which the surface to be coated softens at temperatures below 200° C.

4. The method of claim 3, in which said surface is a porous membrane and said particles have a particle size within the range 0.1 to 0.5 μm.

5. The method of claim 4, in which said surface heating temperature is not more than 10° C. above the "softening" temperature.

6. The method of claim 5, in which said dispersion: (a) contains a non-ionic or anionic wetting agent which can be volatilized during said heating; and (b) is devoid of heavy metal organic complexes.

7. The method of claim 4, in which said surface heating temperature is below the glass transition, as determined by volume expansion, of said polymer.

8. The method of claim 3, in which the content of PTFE particles within said dispersion is within the range 0.3 to 1 percent.

* * * * *